(12) United States Patent
Hayashi

(10) Patent No.: US 11,267,294 B2
(45) Date of Patent: Mar. 8, 2022

(54) TIRE

(71) Applicant: BRIDGESTONE CORPORATION, Tokyo (JP)

(72) Inventor: Shintaro Hayashi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 226 days.

(21) Appl. No.: 16/619,700

(22) PCT Filed: Feb. 20, 2018

(86) PCT No.: PCT/JP2018/006006
§ 371 (c)(1),
(2) Date: Dec. 5, 2019

(87) PCT Pub. No.: WO2018/225304
PCT Pub. Date: Dec. 13, 2018

(65) Prior Publication Data
US 2020/0164693 A1 May 28, 2020

(30) Foreign Application Priority Data
Jun. 7, 2017 (JP) .............................. JP2017-112965

(51) Int. Cl.
*B60C 11/12* (2006.01)
*B60C 11/03* (2006.01)

(52) U.S. Cl.
CPC ...... *B60C 11/1236* (2013.01); *B60C 11/0302* (2013.01); *B60C 11/0304* (2013.01);
(Continued)

(58) Field of Classification Search
CPC ............. B60C 11/1236; B60C 11/1204; B60C 11/1281; B60C 11/0304; B60C 2011/129
See application file for complete search history.

(56) References Cited

U.S. PATENT DOCUMENTS 4,736,783 A 4/1988 Motomura et al.
D525,186 S * 7/2006 Martin ......................... D12/521
(Continued)

FOREIGN PATENT DOCUMENTS

CN 101588934 A 11/2009
CN 102066132 A 5/2011
(Continued)

OTHER PUBLICATIONS

Machine translation for Japan 2016-159861 (Year: 2021).*
(Continued)

*Primary Examiner* — Steven D Maki
(74) *Attorney, Agent, or Firm* — Sughrue Mion, PLLC

(57) ABSTRACT

A tire has, on a tread surface of the tire, five land portions, an installation direction of the tire to a vehicle is designated, intermediate land portions respectively have a communicating sipe 40, the communicating sipe is constituted by a first sipe 41 at a vehicle-installed outside and a second sipe 42 at a vehicle-installed inside, the first sipe and the second sipe have an intersection point P on the vehicle-installed outside of a center line in a tire width direction of the corresponding intermediate land portion, the distance between the intersection point and a land portion edge at the vehicle-installed inside is the largest in an innermost intermediate land portion of the intermediate land portions, and an angle $\theta 1$ of the first sipe to a tire circumferential direction is larger than an angle $\theta 2$ of the second sipe to the tire circumferential direction.

6 Claims, 3 Drawing Sheets

(52) U.S. Cl.
CPC ...... *B60C 11/1204* (2013.01); *B60C 11/1281* (2013.01); *B60C 2011/129* (2013.01); *B60C 2011/1254* (2013.01)

(56) References Cited

U.S. PATENT DOCUMENTS

| | | | |
|---|---|---|---|
| 8,991,452 | B2 | 3/2015 | Oda |
| 9,033,010 | B2 | 5/2015 | Ebiko |
| 10,668,774 | B2 | 6/2020 | Kouda |
| 2010/0089509 | A1 | 4/2010 | Ochi |
| 2011/0146862 | A1 | 6/2011 | Lamontia |
| 2012/0132334 | A1 | 5/2012 | Nomura |
| 2013/0014870 | A1 | 1/2013 | Georges et al. |
| 2016/0144668 | A1* | 5/2016 | Oba ................ B60C 11/125 152/209.25 |
| 2016/0297253 | A1* | 10/2016 | Bonnamour ........ B60C 11/033 |
| 2017/0368888 | A1* | 12/2017 | Wakasugi ............ B60C 11/125 |
| 2018/0015788 | A1 | 1/2018 | Hayashi |
| 2018/0170114 | A1 | 6/2018 | Hayashi |
| 2020/0369089 | A1* | 11/2020 | Speziari ............ B60C 11/1204 |
| 2021/0162816 | A1* | 6/2021 | Nakata ................ B60C 11/1218 |

FOREIGN PATENT DOCUMENTS

| | | | |
|---|---|---|---|
| CN | 104159754 | A | 11/2014 |
| CN | 205326701 | U | 6/2016 |
| CN | 205674788 | U | 11/2016 |
| EP | 2610085 | A1 | 7/2013 |
| JP | 63-106113 | A | 5/1988 |
| JP | 05-178015 | A * | 7/1993 |
| JP | H5-345505 | A | 12/1993 |
| JP | H0616015 | A | 1/1994 |
| JP | H08169213 | A | 7/1996 |
| JP | 2007-168628 | A * | 7/2007 |
| JP | 2012-116306 | A | 6/2012 |
| JP | 2013-514236 | A | 4/2013 |
| JP | 2013-139194 | A | 7/2013 |
| JP | WO2015004913 | A1 | 1/2015 |
| JP | 2016-141157 | A | 8/2016 |
| JP | 2016-159861 | A * | 9/2016 |
| JP | 2016-182927 | A | 10/2016 |
| JP | 2016-203663 | A | 12/2016 |
| WO | 2009/128098 | A1 | 10/2009 |
| WO | 2016/125814 | A1 | 8/2016 |
| WO | 2016/199519 | A1 | 12/2016 |

OTHER PUBLICATIONS

Machine translation for Japan 2007-168628 (Year: 2021).*
Machine translation for Japan 05-178015 (Year: 2021).*
Extended European Search Report dated Dec. 21, 2020 from the European Patent Office in EP Application No. 18814351.5.
Communication dated Mar. 18, 2021, from The China National Intellectual Property Administration in Application No. 201880037502.8.
International Search Report for PCT/JP2018/006006 dated May 15, 2018 [PCT/ISA/210].
International Preliminary Report on Patentability dated Dec. 10, 2019 from the International Bureau in International Application No. PCT/JP2018/006006.

* cited by examiner

TIRE

TECHNICAL FIELD

The present disclosure relates to a tire.

This application is a National Stage of International Application No. PCT/JP2018/006006 filed Feb. 20, 2018, and claims the benefit of priority based on Japanese Patent Application No. 2017-112965 filed on Jun. 7, 2017 in Japan, which is incorporated by reference herein in its entirety.

BACKGROUND

Conventionally, various trials have been performed to improve turning performance (steering stability at the time of cornering situation) and quiet performance by improvement of a tread pattern (for example, PTL 1.)

CITATION LIST

Patent Literature

PTL 1: Japanese Patent Laid-Open No. 2016-203663

SUMMARY

Technical Problem

However, in the conventional art, there has still existed room for improvement regarding achievement of turning performance and quiet performance.

Solution to Problem

The present disclosure is for resolving the above problem, and an object of this disclosure is to provide a tire which simultaneously achieves turning performance and quiet performance.

According to the present disclosure, there is provided a tire having, on a tread surface of the tire, five land portions defined by four circumferential grooves extending along in a tire circumferential direction and a tread ground contact edge an installation direction of the tire to a vehicle being designated, wherein when the five land portions are respectively referred to as, sequentially from a vehicle-installed outside to a vehicle-installed inside, an outer shoulder land portion, an outermost intermediate land portion as an intermediate land portion, a center intermediate land portion as an intermediate land portion, an innermost land portion as an intermediate land portion and an inside shoulder land portion, the intermediate land portions respectively have a communicating sipe extending in a tire width direction to communicate with the circumferential grooves at both ends in the tire width direction defining the corresponding intermediate land portion, in each of the intermediate land portions, the communicating sipe is constituted by a first sipe at the vehicle-installed outside and a second sipe at the vehicle-installed inside, in each of the intermediate land portions, the first sipe and the second sipe have an intersection point on the vehicle-installed outside of a center line in the tire width direction of the corresponding intermediate land portion, a distance between the intersection point and a land portion edge at the vehicle-installed inside of the intermediate land portion is largest in the innermost intermediate land portion of the intermediate land portions, and in each of the intermediate land portions, an angle of the first sipe to the tire circumferential direction is larger than an angle of the second sipe to the tire circumferential direction.

Here, in the present specification, "a tread surface" means an outer circumferential surface over the entire circumference of a tire which contacts to a road surface when the tire assembled to a rim and filled with a predetermined internal pressure is rolled in a state that a maximum load is applied. "A tread ground contact edge" means an edge of the tread surface in the tire width direction.

Here. "a rim" is an industrial standard which is effective for a region in which a tire is produced and used, and refers to an approved rim in an application size (this refers to a measuring rim in STANDARDS MANUAL of ETRTO and a design rim in YEAR BOOK of TRA) described currently or in the future in JATMA YEAR BOOK of JATMA (the Japan Automobile Tyre Manufacturers Association) in Japan, STANDARDS MANUAL of ETRTO (The European Tyre and Rim Technical Organisation) in Europe, and YEAR BOOK of TRA (The Tire and Rim Association, Inc.) in the United States etc. (In other words, the "rim" described above includes, in addition to the current size, a size which can be included in the industrial standard in the future. As an example of "described . . . in the future." a size described as "FUTURE DEVELOPMENTS" in STANDARDS MANUAL 2013 Edition of ETRTO can be listed.) However, in a case of a size not described in the industrial standard, a rim with a width corresponding to a bead width of the tire can be adopted.

Also, "a predetermined internal pressure" refers to air pressure (maximum air pressure) corresponding to maximum load capability of a single wheel in applicable size and ply rating described in the above-described JATMA YEAR BOOK and the like, and in a case of a size not described in the industrial standard, air pressure (maximum air pressure) corresponding to maximum load capability defined for each vehicle to which a tire is installed can be adopted.

"A maximum load" refers to a load corresponding to the maximum load capability.

Additionally, an air described herein can be replaced with inert gas such as nitrogen gas and others.

Unless otherwise noted, in this specification, the dimensions of each component such as a groove and a land portion is deemed to be measured in "a standard state" which is described below. The "standard state" refers to a state that the tire is assembled to the rim and filled with the predetermined pressure to achieve a no-load state. Here, the dimensions of each component such as a groove and a land portion at a tread surface is deemed to be measured on a developed view of the tread surface.

In this specification, "sipe" has a sipe width of 1.5 mm or less over a length of 60% or more of the entire length of the sipe in a tire radial direction. The "sipe width" is an interval of a pair of sipe wall surfaces mutually facing when the interval is orthogonally measured in an extending direction of the sipe, and may be constant or varied in the tire radial direction. The "sipe" is configured such that a pair of sipe wall surfaces mutually facing at least partially contacts to each other directly under load when the tire assembled to the rim and filled with the predetermined pressure is applied a maximum load.

On the other hand, "a groove" has a groove width of more than 1.5 mm over the entire length in the tire radial direction of the groove in the standard state. The "groove width" is an interval of a pair of groove wall surfaces mutually facing when the interval is orthogonally measured in an extending direction of the groove, and may be constant or varied in the tire radial direction. The "groove" is configured such that a pair of groove wall surfaces mutually facing does not contact to each other directly under load when the tire assembled to the rim and filled with the predetermined pressure is applied a maximum load.

Advantageous Effect

According to this disclosure, a tire which simultaneously achieves turning performance and quiet performance can be provided.

DETAILED DESCRIPTION

A tire according to the present disclosure can be used for a pneumatic tire of any kind, and preferably, for a passenger vehicle pneumatic tire, and more preferably, for a passenger vehicle summer pneumatic tire.

Hereinafter, with reference to the drawings, an embodiment of the tire according to this disclosure will be illustrated and explained.

Figure 1:
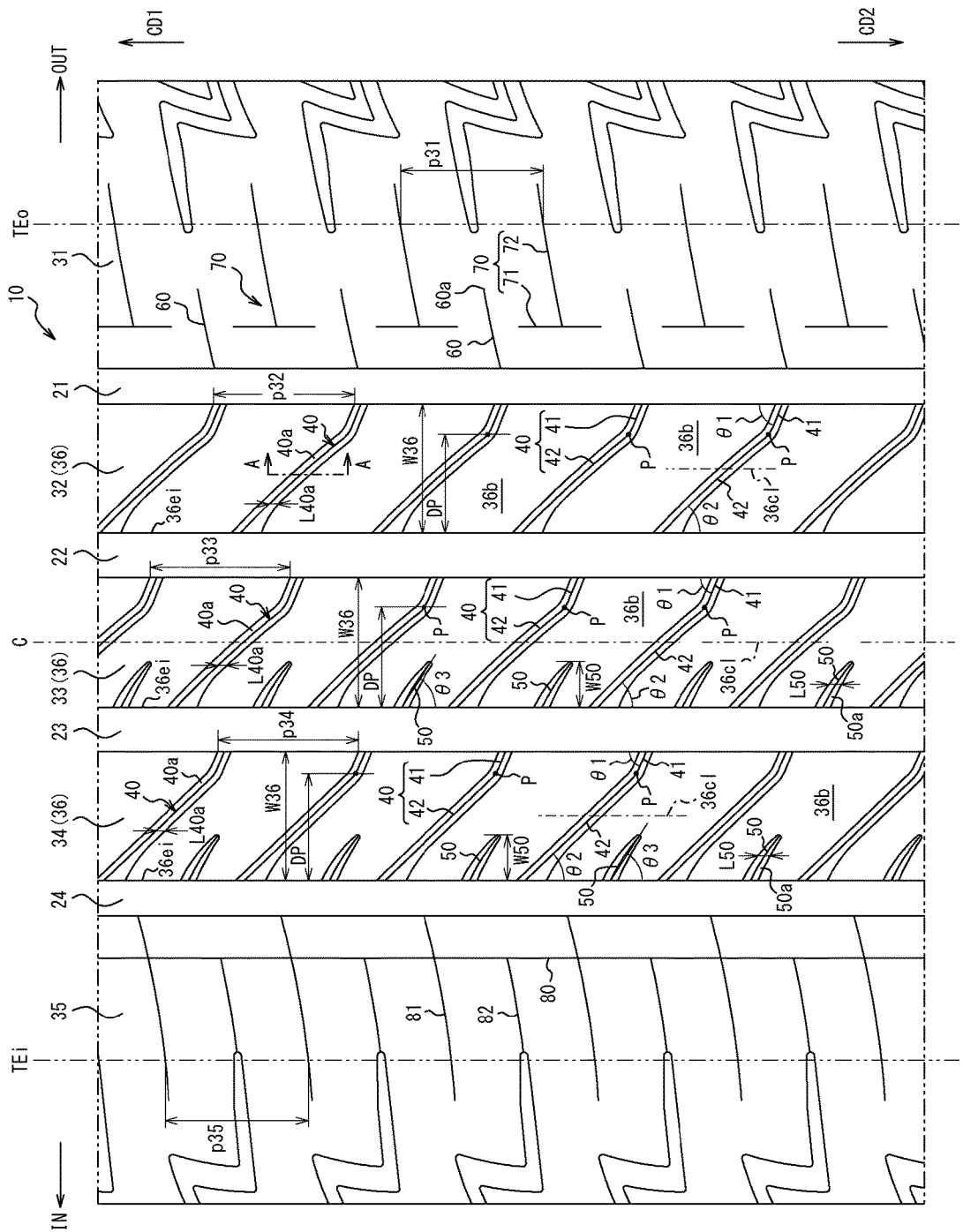
FIG. 1 is a developed view which illustrates a tread surface of a tire according to one embodiment of the present disclosure in a state that it is developed on a plain surface.

FIG. 1 is a developed view when a tread surface 10 of a tire according to an embodiment of the present disclosure is developed on a plain surface. The tire of this embodiment is one with which an installation direction to a vehicle is designated. In FIG. 1, a direction of an OUT arrow illustrates an outside direction in a vehicle width direction when this tire is installed to a vehicle, and a direction of an IN arrow illustrates an inside direction in the vehicle width direction when this tire is installed to the vehicle. An asymmetric tread pattern is provided to the tread surface 10 of this tire.

In this specification, for convenience, an upper side of FIG. 1 is referred to as "a first side in a tire circumferential direction CD1," and a lower side of FIG. 1 is referred to as "a second side in the tire circumferential direction CD2."

In FIG. 1, four circumferential grooves 21 to 24 extending along a tire circumferential direction are provided on the tread surface 10 of the tire according to this embodiment. Five land portions 31 to 35 are defined by these four circumferential grooves 21 to 24 and tread ground contact edges TEo, TEi. These five land portions are respectively referred to as, sequentially from a vehicle-installed outside toward a vehicle-installed inside, an outer shoulder land portion 31, an outermost intermediate land portion 32, a center intermediate land portion 33, an innermost intermediate land portion 34 and an inner shoulder land portion 35.

The outer shoulder land portion 31 is defined by the tread ground contact edge TEo at the vehicle-installed outside and the circumferential groove 21 adjacent to the tread ground contact edge TEBo at the inside in the vehicle width direction. The inner shoulder land portion 35 is defined by the tread ground contact edge TEi at the vehicle-installed inside and the circumferential groove 24 adjacent to the tread ground contact edge TEi at the inside in the vehicle width direction. Three intermediate land portions 36 each of which is defined by an adjacent pair of the circumferential grooves 21 to 24 are provided between the outer shoulder land portion 31 and the inner shoulder land portion 35. These three intermediate land portions 36 are, sequentially from the vehicle-installed outside toward the vehicle-installed inside, the outermost intermediate land portion 32, the center intermediate land portion 33 and the innermost intermediate land portion 34. Although sipe is provided to each intermediate land portion 36 as described later, no groove is provided, that is, each intermediate land portion 36 is constituted as a rib-like land portion.

In an example in the drawings, the circumferential grooves 21 to 24 are linearly provided along a circumferential direction. Also, in the example in the drawings, the center intermediate land portion 33 is located on a tire equator C, and more specifically, its center line 36c1 in a tire width direction is located on the tire equator C.

Each intermediate land portion 36 communicates with circumferential grooves at both sides of the tire width direction defining the corresponding intermediate land portion 36, and has a communicating sipe 40 extending in the tire width direction.

In this specification, "extending in the tire width direction" is not limited to extending in parallel with the tire width direction, but merely refers to extending in a direction intersecting with the tire circumferential direction.

In an example of FIG. 1, the communicating sipe 40 of each intermediate land portion 36 extends to gradually move to the first side in the tire circumferential direction CD1 when it goes from the vehicle-installed outside toward the vehicle-installed inside.

Since the communicating sipe 40 is provided to each intermediate land portion 36, compared with a case where no groove and sipe are provided to each intermediate land portion 36, compression rigidity of each intermediate land portion 36 in the tire radial direction can be lowered, whereby quiet performance and ride comfort can be improved.

In each intermediate land portion 36, the communicating sipe 40 is constituted by a first sipe 41 at the vehicle-installed outside and a second sipe 42 at the vehicle-installed inside. The first sipe 41 and the second sipe 42 extend substantially linearly in the tread surface 10, in which inclination angles to the tire circumferential direction are mutually different. The communicating sipe 40 is shaped to be bent at a bending point P on the tread surface 10, and the bending point P is an intersection point (hereinafter, it is also referred as "an intersection point P") between the first sipe 41 and the second sipe 42.

Figure 2:
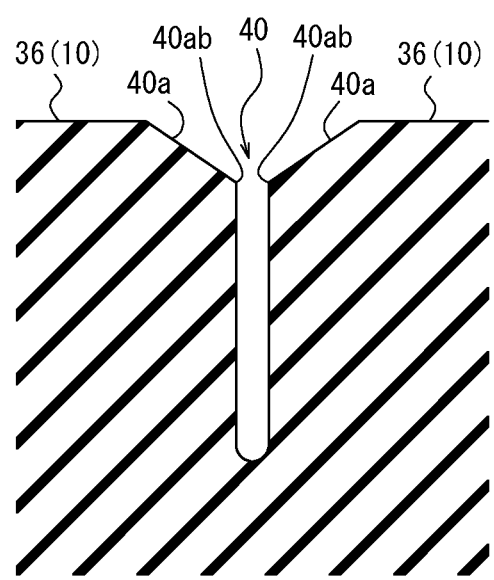
FIG. 2 is a cross-sectional view which illustrates a part of the tire of FIG. 1 taken along the line A-A of FIG. 1.

FIG. 2 is a cross-sectional view along the line A-A of FIG. 1. The line A-A of FIG. 1 is parallel with the tire circumferential direction. As illustrated in FIG. 2, in this example, a pair of sipe wall surfaces which mutually faces in the communicating sipe 40 has, at an end portion at an outside in the tire radial direction (the side of tread surface 10), a chamfered surface 40a in which an edge portion defined by the tread surface 10 is chamfered. In the communicating sipe 40, an inclination angle at an acute angle side to the tire radial direction of the chamfered portion 40a is larger than an angle at the acute angle side to the tire radial direction of the sipe wall surface at an inside in the tire radial direction from the chamfered portion 40a (a lower side of FIG. 2.) Consequently, a sipe width of the communicating sipe 40 gradually decreases from the tread surface 10 toward the inside in the tire radial direction in a region in the tire radial direction corresponding to the chamfered portion 40*a*.

Since the communicating sipe 40 includes the chamfered portion 40*a*, rigidify of the edge portion defined between the sipe wall surface of the communicating sipe 40 and the tread surface 10 can be improved.

Additionally, the communicating sipe 40 may include the chamfered portion 40*a* at only one sipe wall surface, or either sipe surfaces do not need to include the chamfered surface 40*a*.

In a case where the communicating sipe 40 includes the chamfered portion 40*a* as in this example, an extending direction, the shape and an angle of the communicating sipe 40 when the tread surface 10 is seen as explained in this specification refer to an extending direction, the shape and an angle of the communicating sipe 40 when the communicating sipe 40 is seen excluding the chamfered portion 40*a*, that is, when the communicating sipe 40 is seen at a position in the tire radial direction corresponding to an inside end in the tire radial direction 40*ab* (FIG. 2) of the chamfered portion 40*a*.

In each intermediate land portion 36, in the communicating sipe 40, an angle θ1 of the first sipe 41 to the tire circumferential direction is larger than an angle θ2 of the second sipe 42 to the tire circumferential direction. Here, "an angle θ1 of the first sipe 41 to the tire circumferential direction" is an angle of a line connecting both ends in the extending direction of the first sipe 41 at an acute angle side (more than 0° to less than 90°) to the tire circumferential direction when the first sipe 41 is seen excluding the chamfered portion 40*a*. Moreover, "an angle θ2 of the second sipe 42 to the tire circumferential direction" is an angle of a line connecting both ends in the extending direction of the second sipe 42 at an acute angle side to the tire circumferential direction when the second sipe 42 is seen excluding the chamfered portion 40*a*.

Hereinafter, an operational effect by this configuration is explained with reference to FIG. 3.

Figure 3A:
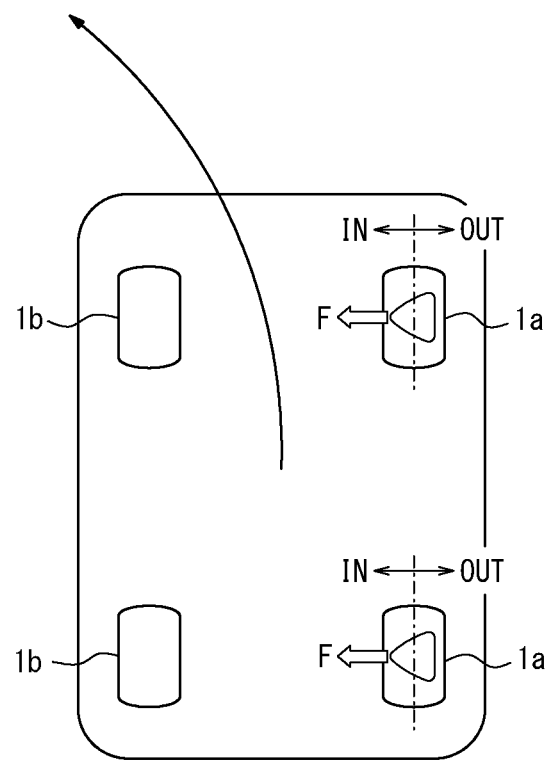
FIG. 3A is a top view for explaining a behavior of the tire when a vehicle is turning and FIG. 3B is a rear view of the vehicle of FIG. 3A.
Figure 3B:
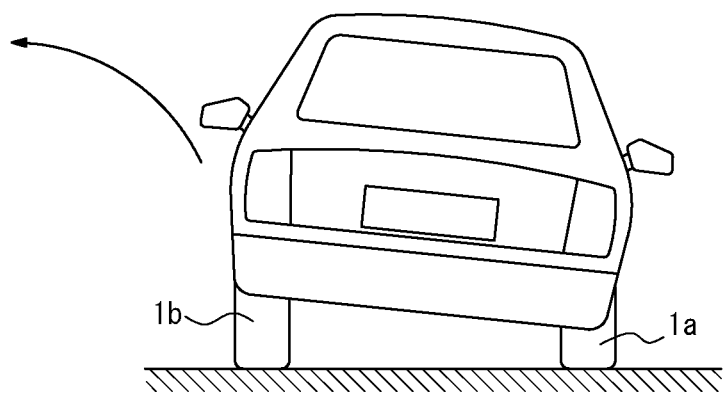

As illustrated in FIG. 3, generally, at the time of cornering situation of a vehicle, a large load is applied to a tire 1*a* at an outside of turning from the vehicle, and the tire 1*a* at the outside of turning receives a large ground contact pressure and a large lateral force F from a road surface. The contact pressure that the tire 1*a* at the outside of turning receives from the road surface gradually decreases from the vehicle-installed outside toward the vehicle-installed inside, and the shape of a contact patch of the tire 1*a* at the outside of turning is substantially triangular in which a ground contact length becomes gradually shorter from the vehicle-installed outside toward the vehicle-installed inside. The lateral force F that the tire 1*a* at the outside of turning receives from the road surface is generated in a direction from the vehicle-installed outside toward the vehicle-installed inside. In this way, the ground contact pressure and the lateral force F received by the tire 1*a* at the outside of turning are larger at the vehicle-installed outside than at the vehicle-installed inside. Additionally, the tire 1*b* at the inside of turning does not receive much ground contact pressure as well as lateral force F, these are not considered here.

Turning back to FIG. 1, in each intermediate land portion 36, a portion of the intermediate land portion 36 at the vehicle-installed outside receives a larger ground contact pressure and a larger lateral force F at the time of cornering situation compared with a portion of the intermediate land portion 36 at the vehicle-installed inside.

In a case where the communicating sipe 40 extends in a straight line and an angle at the acute angle side to the circumferential direction of the communicating sipe 40 is small in each intermediate land portion 36, a block-like portion 36*b* defined by each communicating sipe 40 at the intermediate land portion 36 is easily peeled off at the input of a lateral force (this is referred to as lateral shift. The same is applied hereinafter) at a corner portion at the acute angle side at the vehicle-installed outside.

On the other hand, in a case where the communicating sipe 40 extends in a straight line and an angle at the acute angle side to the circumferential direction of the communicating sipe 40 is large in each intermediate land portion 36, the block-like portion 36*b* between the communicating sipes 40 has a larger angle at the corner portion at the acute angle side of vehicle-installed outside. Due to this, even when the large ground contact pressure and the large lateral force F are received from a road surface at the time of the cornering situation, this corner portion can be against them, whereby this corner portion can inhibit generation of peel-off, and grounding property is improved and thus turning performance is improved.

However, in this case, since the extending direction of the communicating sipe 40 is near the tire width direction, at the time of rolling of the tire (straight running or cornering), minute portions at each position in the tire width direction of an edge at an advancing side of the block-like portion 36*b* between the communicating sipes 40 are substantially grounded simultaneously, so that a pattern noise generated at that time may be increased.

Regarding this point, if the communicating sipe 40 extends in a straight line at the intermediate land portion 36 and an angle at the acute angle side of the communicating sipe 40 to the circumferential direction is small, the minute portions at each position in the tire width direction of the edge at the advancing side of the block-like portion 36*b* between the communicating sipes 40 are grounded at a dispersed timing, so that a pattern noise generated at that time may be reduced. As a result, quiet performance can be improved.

In view of the above, in this embodiment, in the communicating sipe 40 of each intermediate land portion 36, in the first sipe 41 positioned at the vehicle-installed outside which receives the large ground contact pressure and the large lateral force F at the time of cornering situation, the angle θ1 to the tire circumferential direction is relatively large. This effectively inhibits peel-off at the corner portion at the acute angle side of the vehicle-installed outside of the block-like portion 36*b* at the input of the lateral force. Thus, grounding property at the input of lateral force is effectively increased and turning performance can be improved.

Further, in this embodiment, in the communicating sipe 40 of each intermediate land portion 36, in the second sipe 42 positioned at the vehicle-installed inside which does not receive much ground contact pressure and much lateral force F at the time of cornering situation, the angle θ2 to the tire circumferential direction is relatively small. Thus, a pattern noise generated at the time of rolling of the tire can be effectively reduced, and thus quiet performance can be effectively improved.

Also, in this embodiment, in each intermediate land portion 36, the first sipe 41 and the second sipe 42 in the communicating sipe 40 has the intersection point P on the vehicle-installed outside of the center line 36*cl* in the tire width direction of the corresponding intermediate land portion 36. In other words, in each intermediate land portion 36, a distance DP between the intersection point P in the communicating sipe 40 and a land portion end 36*ei* at the vehicle-installed inside of the corresponding intermediate land portion 36 is larger than 50% of a width W36 of the corresponding intermediate land portion 36 in the tire width direction.

Due to this, turning performance provided by the first sipe 41 and quiet performance provided by the second sipe 42 can be more well-balanced. Additionally, in a case where the intersection point P is positioned on the center line 36c1 in the tire width direction of the intermediate land portion 36 or on the vehicle-installed inside of the center line 36cl, although the turning performance is improved, the quiet performance may be lowered.

Additionally, in the example of the drawings, the widths W36 in the tire width direction of the intermediate land portions 36 are substantially equal.

Also, in this embodiment, the distance DP between the intersection point P and the land portion end 36ei at the vehicle-installed inside is the largest at the innermost intermediate land portion 34 of the three intermediate land portions 36.

In the three intermediate land portions 36, the outermost intermediate land portion 32 and the center intermediate land portion 33 located at a relatively vehicle-installed outside receive a large ground contact pressure and a large lateral force F compared to the innermost intermediate land portion 34 at the time of cornering situation. Accordingly, in this embodiment, in the outermost intermediate land portion 32 and the center intermediate land portion 33, the distance DP is made relatively smaller and thus the first sipe 41 is made relatively longer, so that turning performance provided by the first sipe 41 can be effectively improved.

On the other hand, the innermost intermediate land portion 34 located at the most vehicle-installed inside does not receive much ground contact pressure as well as lateral force F at the time of cornering situation compared with the outermost intermediate land portion 32 and the center intermediate land portion 33. Accordingly, in this embodiment, in the innermost intermediate land portion 34, the distance DP is made relatively larger and thus the second sipe 42 is made relatively longer, so that quiet performance provided by the second sipe 42 can be effectively improved.

Additionally, while the distance DP of the outermost intermediate land portion 32 and the distance DP of the center intermediate land portion 33 are substantially equal in the example of the drawings, they may be different.

As described above, due to the tire according to the present disclosure, both turning performance and quiet performance can be excellently achieved. Also, ride comfort can be improved.

From a viewpoint of making turning performance and quiet performance are well-balanced, in each intermediate land portion 36, the angle θ1 of the first sipe 41 of the communicating sipe 40 to the tire circumferential direction is preferably 61° to 79°, more preferably, 66° to 74°. Additionally, while the angles θ1 in each intermediate land portion 36 are substantially equal in the example of the drawings, they may be different.

Also, from the viewpoint of making turning performance and quiet performance are well-balanced, in each intermediate land portion 36, the angle θ2 of the second sipe 42 of the communicating sipe 40 to the tire circumferential direction is preferably 32° to 52°, more preferably, 37° to 47°. Additionally, while the angles θ2 in each intermediate land portion 36 are substantially equal in the example of the drawings, they may be different.

In each intermediate land portion 36, the distance DP between the intersection point P in the communicating sipe 40 and the land portion end 36ei at the vehicle-installed inside of the corresponding intermediate land portion 36 is preferably 73 to 85% of the width W36 in the tire width direction of the corresponding intermediate land portion 36.

By making a ratio of the distance DP to the width W36 of the intermediate land portion 36 73% or more, quiet performance can be effectively improved. On the other hand, by making a ratio of the distance DP to the width W36 of the intermediate land portion 36 less than 85%, turning performance can be effectively improved. Thus, turning performance and quiet performance can be more well-balanced.

In the example of FIG. 1, in each intermediate land portion 36, in the pair of sipe wall surfaces of the second sipe 42 of the communicating sipe 40, in the sipe wall surface at the second side in the tire circumferential direction CD2 defining an acute angle corner portion with the circumferential grooves 22 to 24 adjacent to the vehicle-installed inside, a length in the tire circumferential direction L40a of its chamfered portion 40a gradually increases toward the vehicle-installed inside at an end portion at the vehicle-installed inside of the second sipe 42.

Due to this, rigidity of the acute angle corner portion defined by the sipe wall surface at the second side in the tire circumferential direction CD2 of the second sipe 42 and the circumferential grooves 22 to 24 adjacent to the sipe wall surface at the vehicle-installed inside can be improved, whereby peel-off at the time of the input of the lateral force is inhibited and grounding property is improved. As a result, turning performance is improved.

In the example of FIG. 1 the innermost intermediate land portion 34 includes a semi-communicating sipe 50 which extends in the tire width direction to communicate with the circumferential groove 24 at the vehicle-installed inside defining the innermost intermediate land portion 34 and terminate in the innermost intermediate land portion 34. The center intermediate land portion 33 also includes a semi-communicating sipe 50 which extends in the tire width direction to communicate with the circumferential groove 23 at the vehicle-installed inside defining the center intermediate land portion 33 and terminate in the center intermediate land portion 33. In each of the innermost intermediate land portion 34 and the center intermediate land portion 33, the semi-communicating sipes 50 are alternately arranged with the communicating sipe 40 in the tire circumferential direction.

In this way, by providing the semi-communicating sipe 50 at the vehicle-installed inside in each of the innermost intermediate land portion 34 and the center intermediate land portion 33, compression rigidity in the tire radial direction at the vehicle-installed inside can be lowered. Accordingly, a pattern noise can be reduced and thus quiet performance can be improved. Moreover, ride comfort can be improved.

Also, in each of the innermost intermediate land portion 34 and the center intermediate land portion 33, by not extending the semi-communicating sipe 50 to the vehicle-installed outside, rigidity can be secured at the vehicle-installed outside where a large ground contact pressure and a large lateral force F is received at the time of cornering situation, and thus grounding property and turning performance at the time of cornering situation can be improved.

Also, by not providing the semi-communicating sipe 50 to the outermost intermediate land portion 32, rigidity can be secured at the outermost intermediate land portion 32 where the largest ground contact pressure and the largest lateral force F are received at the time of cornering situation, whereby grounding property and thus turning performance at the time of cornering situation can be improved.

In this way, quiet performance, ride comfort and turning performance can be improved.

In this example, the pair of sipe wall surfaces which mutually faces in the semi-communicating sipe 50 has, at an end portion at an outside in the tire radial direction (the side of tread surface 10), a chamfered surface 50a in which an edge portion defined by the tread surface 10 is chamfered. In the semi-communicating sipe 50, an inclination angle at an acute angle side to the tire radial direction of the chamfered portion 50a is larger than an angle at an acute angle side to the tire radial direction of the sipe wall surface at an inside in the tire radial direction from the chamfered portion 50a. Consequently, a sipe width of the semi-communicating sipe 50 gradually decreases from the tread surface 10 toward the inside in the tire radial direction in a region in the tire radial direction corresponding to the chamfered portion 50a.

Since the semi-communicating sipe 50 includes the chamfered portion 50a, rigidify of the edge portion defined between the sipe wall surface of the semi-communicating sipe 50 and the tread surface 10 can be improved.

Additionally, the semi-communicating sipe 50 may include the chamfered portion 50a at only one sipe wall surface, or either sipe surfaces do not need to include the chamfered surface 50a.

In a case where the semi-communicating sipe 50 includes the chamfered portion 50a as in this example, an extending direction, the shape and an angle of the semi-communicating sipe 50 when the tread surface 10 is seen as explained in this specification refer to an extending direction, the shape and an angle of the semi-communicating sipe 50 when the semi-communicating sipe 50 is seen excluding the chamfered portion 50a, that is, when the semi-communicating sipe 50 is seen at a position in the tire radial direction corresponding to an inside end in the tire radial direction of the chamfered portion 50a.

In the example of FIG. 1., as described above, in each of the innermost intermediate land portion 34 and the center intermediate land portion 33, each of the pair of sipe wall surfaces of the semi-communicating sipe 50 has the chamfered portion 50a. Moreover, in seeing including the chamfered portion 50a, a length in the tire circumferential direction L50 of the semi-communicating sipe 50 at an opening end to the tread surface 10 is gradually decreased from the vehicle-installed inside toward the vehicle-installed outside. Due to this, in each of the innermost intermediate land portion 34 and the center intermediate land portion 33, compared with a case where the length in the tire circumferential direction L50 of the communicating sipe 50 at the opening end to the tread surface 10 is constant, rigidity can be secured at the vehicle-installed outside where a large ground contact pressure and a large lateral force F are received at the time of cornering situation, whereby grounding property and thus turning performance at the time of cornering situation can be improved.

In the innermost intermediate land portion 34, a length W50 in the tire width direction of the semi-communicating sipe 50 is preferably 26 to 35% of the width W36 in the tire width direction of the innermost intermediate land portion 34, and more preferably 30 to 35% of the width W36 in the tire width direction of the innermost intermediate land portion 34. Also, in the center intermediate land portion 33, the length W50 in the tire width direction of the semi-communicating sipe 50 is preferably 26 to 35% of a width W36 in the tire width direction of the center intermediate land portion 33, and more preferably 30 to 35% of the width W36 in the tire width direction of the center intermediate land portion 33.

Due to this, quiet performance, ride comfort and turning performance are more well-balanced.

In the example of FIG. 1, in each of the innermost intermediate land portion 34 and the center intermediate land portion 33, the semi-communicating sipe 50 extends to gradually move to the first side in the tire circumferential direction CD1 when it goes from the vehicle-installed outside to the vehicle-installed inside.

In the example of FIG. 1, in each of the innermost intermediate land portion 34 and the center intermediate land portion 33, an angle θ3 of the semi-communicating sipe 50 to the tire circumferential direction is larger than the angle θ2 of the second sipe 42 of the communicating sipe 40 to the tire circumferential direction. Here, the angle θ3 of the semi-communicating sipe 50 to the tire circumferential direction is an angle of a line connecting both ends in the extending direction of the semi-communicating sipe 50 at an acute angle side (more than 0° to less than 90°) to the tire circumferential direction when the semi-communicating sipe 50 is seen excluding the chamfered portion 50a.

Additionally, while the angle θ3 of the semi-communicating sipe 50 to the tire circumferential direction varies along the tire width direction in the example of the drawings, the angle θ3 is larger than the angle θ2 at each position in the tire width direction.

Due to this, quiet performance and ride comfort can be more improved.

A depths of the communicating sipe 40 and a semi-communicating sipe 60 are preferably shallower than a depth of circumferential grooves 21 to 24. The depths of the communicating sipe 40 and the semi-communicating sipe 60 are 4.5 to 5.5 mm for example, and the depth of the circumferential grooves 21 to 24 is 6.5 to 8.0 mm for example.

In the example of FIG. 1, the semi-communicating sipe 60 and a T-shaped sipe 70 are provided at the outer shoulder land portion 31.

The semi-communicating sipe 60 communicates with the circumferential groove 21 at the vehicle-installed inside defining the outer shoulder land portion 31 and extends in the tire width direction to terminate in the outer shoulder land portion 31 before reaching the tread ground contact edge TEo. In the example of the drawings, the semi-communicating sipe 60 extends to gradually move to the first side in the tire circumferential direction CD1 when it goes to the outside in the tire width direction.

The T-shaped sipe 70 is constituted by a circumferential sipe 71 extending in the tire circumferential direction and a lateral sipe 72 which communicates with an intermediate portion in the tire circumferential direction of the circumferential sipe 71 and extends in the tire width direction to reach the tread ground contact edge TEo. In the example of the drawings, the lateral sipe 72 extends to gradually move to the first side in the tire circumferential direction CD1 when it goes to the outside in the tire width direction.

By providing the semi-communicating sipe 60 and the T-shaped sipe 70 to the outer shoulder land portion 31, compared to a case where no groove and no sipe are provided to the outer shoulder land portion 31, a pattern noise or uneven wear generated on the outer shoulder land portion 31 can be reduced.

The circumferential sipe 71 of the T-shaped sipe 70 is located at the outside in the tire width direction than an inner end in the tire width direction of the semi-communicating sipe 60. Also, the semi-communicating sipe 60 and the T-shaped sipe 70 are alternately arranged in the tire circumferential direction. In other words, the semi-communicating sipe 60 and the T-shaped sipe 70 are in a staggered arrangement.

Due to this, rigidity of the outer shoulder land portion 31 which receives a large ground contact pressure and a large lateral force F at the time of cornering situation is increased, and thus turning performance can be improved. Additionally, if both ends in the tire circumferential direction of the circumferential sipe 71 of the T-shaped sipe 70 are respectively allowed to communicate with the semi-communicating sipe 60 at both sides in the tire circumferential direction, as a result that the outer shoulder land portion 31 are finely divided to block-like, rigidity is lowered and turning performance may be lowered.

In the example of FIG. 1, in the outer shoulder land portion 31, an outer end in the tire width direction 60a of the semi-communicating sipe 60 is located at the outside in the tire width direction than the circumferential sipe 71 of the T-shaped sipe 70. In other words, the semi-communicating sipe 60 is overlapped on the T-shaped sipe 70 in the tire circumferential direction.

Due to this, generation of uneven wear in the outer shoulder land portion 31 can be inhibited. Additionally, if the semi-communicating sipe 60 is not overlapped on the T-shaped sipe 70 in the tire circumferential direction, the outer shoulder land portion 31 easily slips at an advancing side at the time of grounding, so that uneven wear may be generated.

In the example in FIG. 1, in the inner shoulder land portion 35, a circumferential sipe 80, a first lateral sipe 81 and a second lateral sipe 82 are provided.

The circumferential sipe 80 continuously extends in the tire circumferential direction over the entire circumference of the tire.

The first lateral sipe 81 communicates with the circumferential groove 24 at the vehicle-installed outside defining the inner shoulder land portion 35 and extends in the tire width direction to reach the tread ground contact edge TEi. In the example of the drawings, the first lateral sipe 81 extends to gradually move to the second side in the tire circumferential direction CD2 when it goes to the outside in the tire width direction.

The second lateral sipe 82 communicates with the circumferential sipe 80 and extends in the tire width direction to reach before the tread ground contact edge TEi. In the example of the drawings, the second lateral sipe 82 extends to gradually move to the second side in the tire circumferential direction CD2 when it goes to the outside in the tire width direction.

The first lateral sipe 81 and the second lateral sipe 80 are alternately arranged in the tire circumferential direction.

Due to this, a pattern noise and uneven wear generated in the inner shoulder land portion 35 can be reduced.

The number of pitches of the outer shoulder land portion 31 is preferably larger than the number of pitches of the inner shoulder land portion 35. Also, the numbers of pitches of the three intermediate land portions 36 are mutually equal between each intermediate land portion 36, and preferably less than the number of pitches of the outer shoulder land portion 31 and the number of pitches of inner shoulder land portion 35. Here, the number of pitches of the outer shoulder land portion 31, the outermost intermediate land portion 32, the center intermediate land portion 33, the innermost intermediate land portion 34 and the inner shoulder land portion 35 are respectively the number of pitches p31, p32, p33, p34 and p35 of the corresponding pattern in the entire circumference of the tire.

By making the number of pitches of the outer shoulder land portion 31 maximum, in the outer shoulder land portion 31 which receives the large ground contact pressure and the large lateral force F at the time of cornering situation, a ground contact length at the time of turning can be increased. Accordingly, grounding property can be improved and turning performance can be improved.

Also, by making the number of pitches of the outer shoulder land portion 31, the inner shoulder land portion 35 and the intermediate land portions 36 different to each other, a frequency of a pattern noise generated at each land portion can be made different. Consequently, a pattern noise as the entire tire can be reduced, and quiet performance can be improved. Additionally, if the numbers of pitches are equal in all the land portions 31 to 35, a sound with a specific frequency tends to be too loud, so that the pattern noise as the entire tire may be increased.

In this way, turning performance and quiet performance can be more improved.

Additionally, since the number of pitches of the inner shoulder land portion 35 is larger than the number of pitches of the intermediate land portion 36, grounding property of the inner shoulder land portion 35 when the vehicle is in a cornering situation to apply a load to the inner shoulder land portion 35 can be improved, whereby a ground contact length of the inner shoulder land portion 35 can be improved. Due to this, turning performance can be improved.

INDUSTRIAL APPLICABILITY

The tire according to the present disclosure can be used for a pneumatic tire of any kind, and preferably, for a passenger vehicle pneumatic tire, and more preferably, a summer passenger vehicle pneumatic tire.

REFERENCE SIGNS LIST

1a Tire at the outside of turning
1b Tire at the inside of turning
10 Tread surface
21 to 24 Circumferential grooves
31 Outer shoulder land portion
32 Outermost intermediate land portion
33 Center intermediate land portion
34 Innermost intermediate land portion
35 Inner shoulder land portion
36 Intermediate land portion
36b Block-like portion of an intermediate land portion
36c1 Center line in the tire width direction of the intermediate land portion
36ei Land portion end at the vehicle-installed inside of the intermediate land portion
40 Communicating sipe
40a Chamfered portion of the communicating sipe
40ab Inside end in the tire radial direction of the chamfered portion
41 First sipe of the communicating sipe
42 Second sipe of the communicating sipe
50 Semi-communicating sipe
50a chamfered portion of the semi-communicating sipe
60 Semi-communicating sipe
60a Outer end in the tire width direction of the semi-communicating sipe
70 T-shaped sipe
71 Circumferential sipe of the T-shaped sipe
72 Lateral sipe of the T-shaped sipe 80 Circumferential sipe
81 First lateral sipe
82 Second lateral sipe
C Tire equator
DP Distance between the intersection point and the land portion end at the vehicle-installed inside of the intermediate land portion
F Lateral force
L40a Length in the tire circumferential direction of the chamfered portion of the communicating sipe
L50 Length in the tire circumferential direction of the semi-communicating sipe at the opening end to the tread surface
IN Vehicle-installed inside
OUT Vehicle-installed outside
P Intersection point between the first sipe and the second sipe
p31 to p35 Pitches
TEo, TEi Ground contact edge
W36 Width of the intermediate land portion
W50 Length in the tire width direction of the semi-communicating sipe
θ1 Angle of the first sipe to the tire circumferential direction
θ2 Angle of the second sipe to the tire circumferential direction
θ3 Angle of the semi-communicating sipe to the tire circumferential direction

The invention claimed is:

1. A tire having, on a tread surface of the tire, five land portions defined by four circumferential grooves extending along in a tire circumferential direction and a tread ground contact edge, an installation direction of the tire to a vehicle being designated, wherein
when the five land portions are respectively referred to as, sequentially from a vehicle-installed outside to a vehicle-installed inside, an outer shoulder land portion, an outermost intermediate land portion as an intermediate land portion, a center intermediate land portion as an intermediate land portion, an innermost land portion as an intermediate land portion, and an inside shoulder land portion,
the intermediate land portions respectively have a communicating sipe extending in a tire width direction to communicate with the circumferential grooves at both ends in the tire width direction defining the corresponding intermediate land portion,
in each of the intermediate land portions, the communicating sipe is constituted by a first sipe at the vehicle-installed outside and a second sipe at the vehicle-installed inside,
in each of the intermediate land portions, the first sipe and the second sipe have an intersection point on the vehicle-installed outside of a center line in the tire width direction of the corresponding intermediate land portion,
a distance between the intersection point and a land portion edge at the vehicle-installed inside of the intermediate land portion is largest in the innermost intermediate land portion of the intermediate land portions, and
in each of the intermediate land portions, an angle of the first sipe to the tire circumferential direction is larger than an angle of the second sipe to the tire circumferential direction.

2. The tire according to claim 1, wherein the innermost intermediate land portion and the center intermediate land portion respectively have a semi-communicating sipe which extends in the tire width direction to communicate with the circumferential groove at the vehicle-installed inside defining the corresponding innermost intermediate land portion or the corresponding center intermediate land portion and terminate in the corresponding innermost intermediate land portion or the corresponding center innermost intermediate land portion, and
in each of the innermost intermediate land portion and the center intermediate land portion, the semi-communicating sipe is alternately arranged with the communicating sipe in the tire circumferential direction.

3. The tire according to claim 2, wherein in each of the innermost intermediate land portion and the center intermediate land portion, a length of the semi-communicating sipe in the tire width direction is 26 to 35% of a width of the corresponding innermost intermediate land portion or the corresponding center intermediate land portion.

4. The tire according to claim 2, wherein in each of the innermost intermediate land portion and the center intermediate land portion, an angle of the semi-communicating sipe to the tire circumferential direction is larger than an angle of the second sipe in the tire circumferential direction.

5. The tire according to claim 1, wherein in each of the intermediate land portion, the distance between the intersection point and the land portion edge of the intermediate land portion at the vehicle-installed inside is 73 to 85% of a width of the corresponding intermediate land portion.

6. The tire according to claim 1, wherein the number of pitches of the outer shoulder land portion is larger than the number of pitches of the inner shoulder land portion,
the number of pitches of the intermediate land portions are equal in each intermediate land portion, and less than the number of pitches of the outer shoulder land portion and the number of pitches of the inner shoulder land portion.

* * * * *